R. B. GOODSON.
FERTILIZER DISTRIBUTER.
APPLICATION FILED MAR. 31, 1916.
1,217,863.
Patented Feb. 27, 1917.
2 SHEETS—SHEET 1.
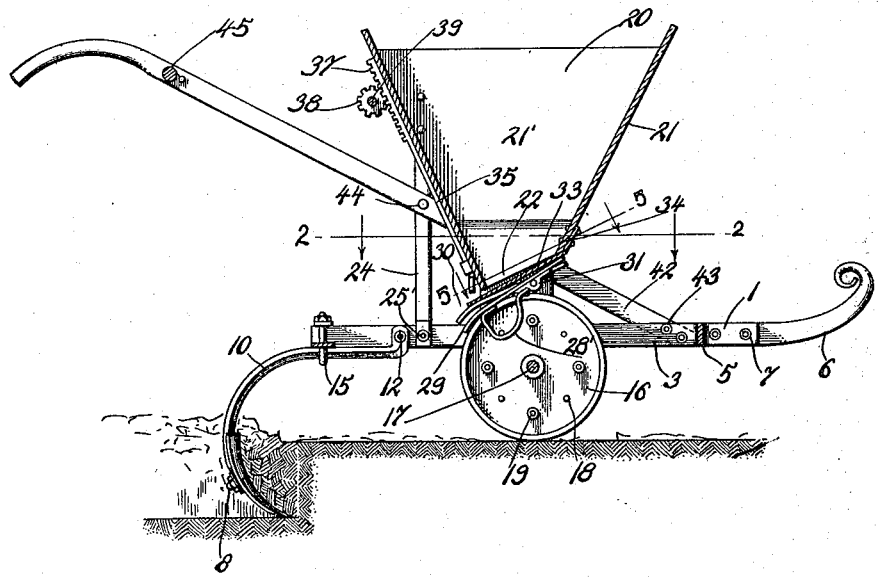
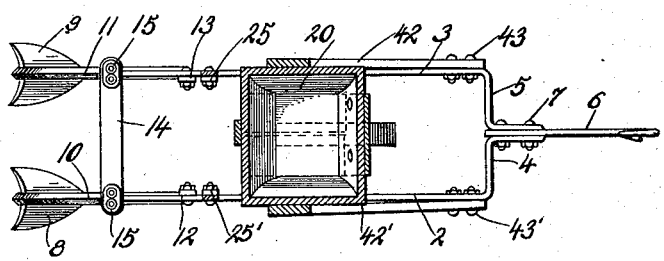
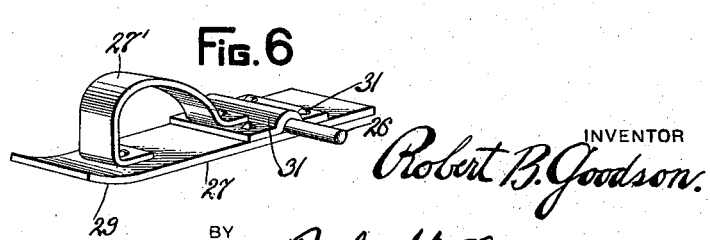
WITNESSES
INVENTOR
Robert B. Goodson.
BY
ATTORNEY

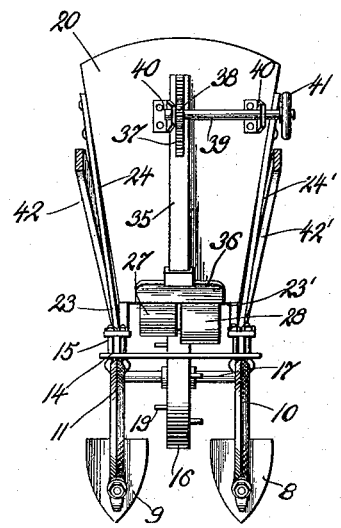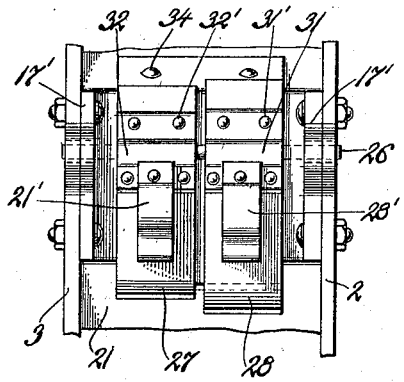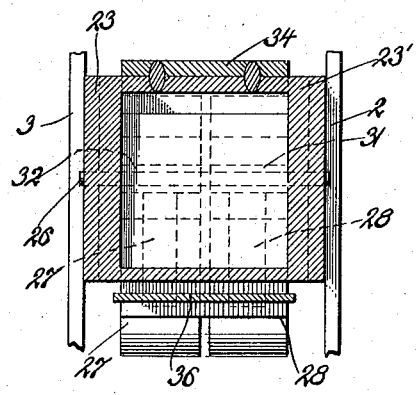

UNITED STATES PATENT OFFICE.

ROBERT B. GOODSON, OF LAMAR, SOUTH CAROLINA.

FERTILIZER-DISTRIBUTER.

1,217,863.  Specification of Letters Patent.  Patented Feb. 27, 1917.

Application filed March 31, 1916. Serial No. 88,147.

*To all whom it may concern:*

Be it known that I, ROBERT B. GOODSON, a citizen of the United States, residing at Lamar, in the county of Darlington and State of South Carolina, have invented certain new and useful Improvements in Fertilizer-Distributers, of which the following is a specification.

My invention relates to fertilizer distributers, and more particularly has for its object the provision of a fertilizer distributer, whereby the fertilizer may be evenly distributed over the ground in an efficient manner.

The invention contemplates the provision of a fertilizer distributer comprising a receptacle for receiving fertilizer, said receptacle being suitably supported by a wheel arranged therebeneath; means being provided at the bottom of the receptacle in form of a plurality of pivotally mounted plates the pivotal supporting means for said plates having bearings in the sides of said receptacle, which plates have secured to the underside or base, depending arms, or plates, which are in turn so actuated as to constitute means whereby the contents of the receptacle may be agitated and consequently discharged through an opening onto the ground; the means comprising a plurality of pins, or lugs, positioned upon both faces of said supporting wheel and extending laterally therefrom, the pins or lugs being arranged in echelon, or that is to say, the pins arranged upon one side face of the supporting wheel are staggered with relation to the pins as carried upon the remaining side of the supporting wheel.

Another object of the invention, resides in the provision of novel means for regulating the size of the discharge opening, consequently, serving as means for positively controlling the discharge of the fertilizer from the receiving and distributing receptacle.

To provide for means whereby the earth may be turned or worked, I propose to mount upon the frame of the distributer, a pair of cultivator shovels, which, will serve as means for thoroughly mixing the fertilizer with the earth or soil. These cultivators are preferably positioned at a point beyond the discharge of the distributing receptacle, so that sufficient time may be allotted for the distributing of the fertilizer on the ground, before the ground or earth is turned upon itself.

All of the foregoing, together with additional advantageous details and arrangements of the parts of the preferred embodiment of my invention, will be clear from the specific description hereinafter contained, when read in connection with the accompanying drawings forming a part hereof, wherein said embodiment of the invention is illustrated for the purpose of facilitating a full understanding of the present invention.

In the drawings:—

Figure 1 is a vertical section in elevation;

Fig. 2 is a section taken on the lines 2—2 of Fig. 1;

Fig. 3 is a rear elevation;

Fig. 4 is a plan in detail of the discharging and agitating plates;

Fig. 5 is a section taken on the lines 5—5 of Fig. 1; and

Fig. 6, is a perspective, showing to advantage the operating means for the said agitating and discharging plates.

Referring now more specifically to the drawings, wherein like reference characters designate like or corresponding parts throughout the several views, I provide a frame member for supporting the receptacle as a whole, and designate the same as at 1, in its entirety. This frame comprises side members or bars 2, and 3, the forward ends thereof being bent upon the body portion thereof and disposed at substantially right angles thereto, as at 4 and 5, while the extremities of said angularly disposed portions are so disposed as to be parallel with the body portions of the side members 2 and 3, and being so arranged as to constitute an efficient bracket member. Between this bracket member there is positioned a draft connection having the forward ends thereof turned upon itself to afford a sufficient bumper or the like, this connection being referred to at 6, and is held between the said bracket member by means of bolts numbered 7, or other suitable fastening devices which are passed through suitable openings arranged in the bracket member and then through said element 6. The rear ends or extremities of the side portions 2 and 3, have secured thereto cultivator shovels 8 and 9, which are supplied with the usual standards or connecting means as at 10 and 11, which are in turn secured to the side portions 2 and 3, respectively, as at 12 and 13 by means of some suitable fastening devices, such as bolts or the like. In order to provide for means whereby supports may be provided for the standards 10 and 11, I arrange transversely of the outer extremities of said side portions, 2 and 3, a transversely arranged bar 14, which bar is connected at its extremities to the side portions 2 and 3, by means of U-bolts 15, the lower portions of which embrace the standards 10 and 11, and thereby afford means whereby the cultivator shovels 8 and 9 may be rigidly supported. It is to be also noted that the transversely arranged bar permits the bracing of the side portions 2 and 3, that is to say by holding the same in spaced relation.

The frame structure, as above described, is supported by means of a wheel 16, which wheel is rotatably supported upon an axle member 17, journaled within suitable bearings 17' arranged upon said frame, not shown. The construction of this wheel is immaterial, but in the preferred embodiment I show the same as being constructed from complemental sections, which sections are secured together, by means of connecting pins or rivets 18, which are passed through the web portion thereof. Arranged about the web portion of the wheel 16 and at a point adjacent the tread thereof, I provide a plurality of circularly disposed fingers or lugs 19, which extend laterally of said wheel. These fingers or lugs 19 are provided upon both side faces of the wheel 16 and are arranged in echelon, or the pins upon one side face of the wheel are staggered with relation to the pins upon the remaining side face of the wheel.

Supported upon the frame 1 and arranged directly above the wheel 16 is a fertilizer receiver and distributing receptacle 20, which is in form of a hopper, having divergent end and side pieces 21 and 21', respectively. The bottom of the receptacle is left open, as at 22, the forward end piece 21 being of less length than the rear piece, consequently, causing the said opening 22 to be obliquely arranged with relation to said frame 1. The receptacle 20, is provided with, at its bottom, supporting legs 23 and 23', which supporting legs are in turn fastened upon the side portions of the frame member 1, in a substantially rigid manner. To provide for additional supporting means for the receptacle or hopper, 20, vertically disposed standards 24 and 24' are secured to the sides thereof and extend downwardly into engagement with the side portions 2 and 3 of the frame 1, whereupon they are securely affixed thereto, as at 25 and 25' by means of bolts or the like. In order to provide for means whereby the fertilizer as contained in the receptacle or hopper 20 may be efficiently discharged therefrom and evenly distributed over the ground or earth I journal a supporting shaft or rod 26 in the supporting portions 23 and 23' at a point substantially adjacent the forward ends thereof. Upon this supporting rod or shaft 26, I position discharge or agitating plates 27 and 28, which plates comprise a strip of flat material, such as metal or the like, having the rear extremities thereof bent slightly downwardly, as at 29 and 30, thus providing for means whereby the direct drop of the fertilizer from the agitating or discharging plates 27 and 28 may be facilitated. Secured to the under sides of the agitating plates 27 and 28 are depending arms 27' and 28' which arms comprise a strip of metal bent upon itself to afford a curved bearing surface at the forward end thereof, for engagement with the fingers or lugs 19, as will be hereinafter more fully described. To provide means whereby the plates 27 and 28 may be fixedly mounted upon the supporting shaft 26, I arrange thereupon and forwardly thereof, bearing plates or journals 31 and 32, the same being secured to their respective plates by means of rivets, as at 31' and 32'. Positioned above the agitating or discharging plates 27 and 28 is a closure plate 33 one end thereof being bent at an angle to the body portion, and secured to one of the end members of the hopper 20, as at 34. The closure is of such size as to extend slightly beyond the opening 22 of the hopper 20 for a purpose which will be subsequently apparent, and is constructed of such material as will be readily flexed. To provide for means whereby the discharge of fertilizer from the hopper or receptacle 20 may be governed by the user, I slidably mount upon the rear end member 21, a gage or cut off 35, the lower extremity of which is provided with a widened portion or gate valve 36, which gate valve is bent at a slight angle to the body portion 35, while the upper extremity of the body portion is provided with a rack 37 which is engaged by a pinion 38, carried upon a shaft 39, supported within suitable bearings 40 to the rear end member 21, and having arranged upon its outer end or extremity a handle member 41, whereby the pinion may by conveniently turned so as to actuate the gage through the medium of the rack 37.

Handle members 42 and 42' are secured to the side portions 2 and 3 of the frame, as at 43 and 43', and extend obliquely upward to a position whereat they will be convenient to the operator for use. The handle members are also secured to the vertically disposed supporting standards 24 and 24' at a point intermediate their ends as at 44 and may be provided with the usual cross brace 45 for holding the same in spaced relation.

In operation and assuming that the distributer is being moved over a field, the pins 19 will, due to the rotation of the wheel 16, alternately engage the depending arms 27' and 28', which are secured to the agitating plates 27 and 28, causing the same to move the closure plate 33 up and down, consequently allowing fertilizer to be discharged through the opening 22 onto the closure plate 33, whereupon it is conveyed to the curved end portions 29 and 30 of the agitating plates 27 and 28, whereupon, the fertilizer will be delivered on to the earth. Should the operator desire to increase or decrease the flow of fertilizer from the hopper 20, he may accordingly adjust the gage 25 by means of the handle 41, which when rotated, will cause the pinion 38 to move the rack 37, upwardly or downwardly, consequently regulating the cut off plate 36. Upon continued travel of the fertilizer, the cultivator shovels 8 and 9 will cause that soil upon which the fertilizer has been distributed to be turned upon itself, thereby thoroughly admixing the same therewith.

In accordance with the provisions of the patent statutes, I have described the principle of my invention together with the apparatus which I now consider to represent the best embodiment thereof, but I desire to have it understood that the apparatus shown is only illustrative and that different arrangement of the parts from those herein shown and described for producing the desired results may be employed together with mechanical equivalents of some or of all said parts, without departing from the spirit of the invention or the scope of the appended claims.

Having thus fully described my invention what I claim to be new and desire to secure by Letters Patent is:—

1. A fertilizer distributer, comprising a wheeled frame, a hopper supported by said frame, a closure plate for said hopper, pivotally supported agitating plates, for alternately actuating said closure plate, means arranged upon the wheel of said frame for alternately actuating said agitating plates, and means carried by said frame for mixing the distributed fertilizer with the soil.

2. A fertilizer distributer, comprising a wheeled frame, a hopper supported by said frame, a closure plate associated with the discharge end of said hopper, rigidly supported agitating means for actuating said closure plate, means arranged upon the wheel of said frame for alternately actuating said agitating means, means for regulating discharge of fertilizer from said hopper, and means carried by said frame for mixing the distributed fertilizer with the soil.

3. A distributer, including a frame, a hopper arranged on said frame, a flexible closure plate for said hopper, means for intermittently engaging said plate whereby the same will be opened and closed, and means engageable with said first-mentioned means for successively actuating the same.

4. A distributer, including a wheeled frame, a hopper arranged on said frame, a flexible closure plate for said hopper, a plurality of pivotal agitating members engageable with said plate for intermittently opening and closing the same, and means arranged upon the wheel for successively engaging said agitating members whereby to operate the same.

5. A distributer, including a wheeled frame, a hopper arranged on said frame, a flexible closure plate for said hopper, a plurality of pivotal agitating members alternately engaged with said plate for intermittently opening and closing the same, depending arms carried by said agitating members, and tripping means arranged upon the wheels for successively engaging said arms whereby to operate the same.

6. A distributer, including a frame, a hopper supported on said frame, a closure for said hopper, means for intermittently opening said closure, a cut-off member arranged in proximity of the discharge end of the hopper for controlling the discharge therefrom, said cut-off member having an elongated toothed extension, and a pinion journaled in the hopper engaged with the toothed extension for operating the same.

7. A distributer, including a wheeled frame, a hopper on said frame, a flexible closure plate for said hopper, a plurality of pivotal agitating means alternately engageable with said plate for intermittently opening and closing the same, means arranged on the wheel for successively engaging said agitating members to operate the same, a cut-off member arranged in proximity of the discharge end of the hopper for controlling the discharge therefrom, said cut-off member having an elongated toothed extension, and a pinion journaled in the hopper and engaged with the toothed extension for operating the same.

In testimony whereof I affix my signature in presence of two witnesses.

ROBERT B. GOODSON.

Witnesses:
  JNO. C. WALTON,
  T. E. WINDHAM.